United States Patent [19]
Swanson

[11] 3,891,928
[45] June 24, 1975

[54] VLF PHASE TRACKER WITH PHASE DISCRETION

[76] Inventor: Eric R. Swanson, 640 Silvergate Ave., San Diego, Calif. 92106

[22] Filed: Mar. 25, 1974

[21] Appl. No.: 454,183

[52] U.S. Cl. .................................. 325/474; 325/478
[51] Int. Cl.² ............................................ H04B 1/10
[58] Field of Search ........... 325/476, 473, 478, 371, 325/474

[56] References Cited
UNITED STATES PATENTS
3,652,939   3/1972   Levasseur .......................... 325/476

Primary Examiner—George H. Libman
Attorney, Agent, or Firm—R. S. Sciascia; G. J. Rubens; T. M. Phillips

[57] ABSTRACT

VLF phase tracker apparatus for comparing phase of individual cycles of received signals with a reference tracked phase. If minimal noise is present, received phase is within close tolerance of the reference. If more than minimal noise is present, departure from the reference indicates noise contamination whereby receiver apparatus are blanked to eliminate noise perturbations.

5 Claims, 1 Drawing Figure

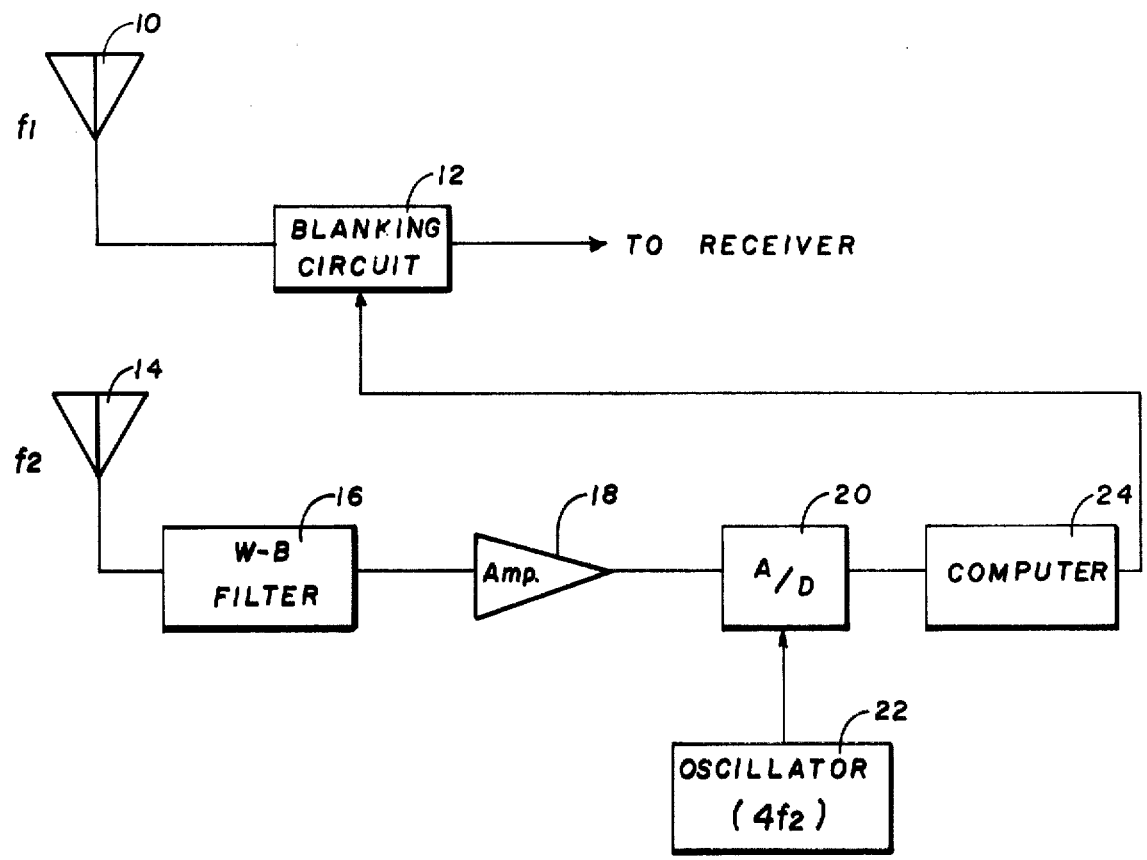

VLF PHASE TRACKER WITH PHASE DISCRETION

BACKGROUND OF THE INVENTION

Phase trackers and phase tracking receivers are well-known in the prior art, including those intended for use in the very low frequency (VLF) range. Within the VLF band it has been widely recognized that noise is of a highly impulsive nature and is primarily created by lightning within thunderstorms. Consequently, prior art receiver designs have incorporated some form of hard limiting or clipping circuitry to discriminate against large noise spikes.

In general, existing phase tracking apparatus are functionally connected to an antenna or other signal source so as to control internally or externally some quantity in fixed relationship with the incoming signal phase. A signal is received and passed through a blanking circuit to a narrow-band filter. The filter output is amplified and fed to amplitude and phase measurement circuitry. A signal of excessive amplitude can be sensed to activate amplitude dependent blanking circuitry to prevent large bursts of energy from entering the filter and causing excessive ringing.

A major disadvantage of such prior art devices is that the sensing circuits become inoperative when blanking is activated. The concept disclosed herein eliminates the above disadvantage in a novel manner. Once phase lock is obtained, the phase of individual cycles of received signals is compared with a reference tracked phase to produce control information from phase comparison. In a low noise environment, the received phase will be within a very small tolerance of the reference; in a higher noise environment, departure from the reference indicates severe noise contamination.

SUMMARY OF THE INVENTION

Phase tracker apparatus are disclosed which incorporate phase discretion circuitry. The presence of minimal noise on received signals has minimal effect on received signal phase with respect to a reference signal; however, excessive noise perturbation causes the received phase to depart from the reference signal, whereby receiver apparatus can be blanked or gated to eliminate the noise perturbations. Once phase lock is obtained, the phase of the individual cycles of the received signals is compared with a reference track phase. Under normal circumstances the input phase remains relatively constant except for jitter, and if the noise level is low, the received phase is within a very small tolerance of the reference. Higher noise environments cause departure from the reference. Blanking is steered by information derived from any other signal measured simultaneously and is not necessarily derived from the same signal being tracked.

STATEMENT OF THE OBJECTS OF INVENTION

It is the primary object of the present invention to provide VLF phase tracker apparatus having phase discretion circuitry for detecting noise contamination of received signals.

It is yet another object of the present invention to disclose phase tracker apparatus having capability for detecting noise bursts in incoming VLF signals.

Other objects, advantages and novel features of the invention will become apparent from the following detailed description of the invention when considered in conjunction with the accompanying drawing.

BRIEF DESCRIPTION OF THE DRAWING

The FIGURE is a simplified block diagram of a VLF phase tracking system incorporating the inventive concept.

DESCRIPTION OF THE PREFERRED EMBODIMENT

In prior art apparatus as earlier disclosed, a signal with excessive amplitude can be sensed to activate an amplitude dependent control. Amplitude blanking prevents large bursts of energy from entering the filter and causing excessive ringing. The present inventive concept derives receiver blanking control information from phase comparison of received signals with a reference signal, and can be used by itself or in conjunction with amplitude controlled blanking as in the prior art. The use of phase control blanking is preferable over amplitude control blanking because with the latter, the sensing circuitry becomes inoperative when the blanking gate is activated, unless corrective action is taken by judicious selection of time-constants in the amplitude control lines.

The Figure illustrates circuitry embodying the above-described inventive concept. Incoming signals at frequency $f_1$ are received by the antenna 10 and coupled to the blanking circuit 12 whose output is fed to conventional receiver apparatus (not shown). The blanking circuit 12 also receives an input from the "sensing" circuit to be described hereinafter.

The sensing circuit comprises a second antenna 14 which receives incoming signals at frequency $f_2$. The received signals are passed through the wide band filter 16, amplified in 18, and converted in the analog-to-digital converter 20. Wide-band filter 16 should be tuned to frequency $f_2$ but should have sufficient bandwidth to allow rapid response to noise change that will be detected as rapid phase change. The analog-to-digital converter 20 is driven by a signal at $4f_2$ from the oscillator 22. The signal $f_2$ can be equal to $f_1$, but it need not be equal thereto. Analog-to-digital converter 20 may be an 8 bit microsecond model ADCF manufactured by Analog Devices. Converter 20 will not be sensitive to other frequencies as long as it is being driven at the $4f_2$ speed.

Essentially, the sensing circuit described above performs sampling of the received signal in quadrature. Thus, the phase of the sensed signal at $f_2$ is given by the following equation:

$$\phi = \tan^{-1} \frac{E_i}{\frac{|E_{i+1}| + |E_{i-1}|}{2}}$$

The amplitude is given by the following equation:

$$A = \sqrt{E_i^2 + \left(\frac{|E_{i+1}| + |E_{i-1}|}{2}\right)^2}$$

where
$\phi$ = phase
$A$ = amplitude
$E$ = encoded voltage, and,
$i$ = sampling index A small, digital computer 24 is used to derive the blanking signals by comparing the phase and/or amplitude computed from the above expressions with nominal, selectively predetermined values. The comparisons provide indications of variations due to perturbed conditions. The output of the computer 24 during a perturbed condition will thus activate the blanking circuit 12 until the computer processing indicates that conditions have returned to normal (nominal). Nominal values are determined from the normally tracked value, i.e. equal to nominal values of received signal as averaged over a period of time.

The primary object of the apparatus of the Figure is to rapidly detect phase changes due to anomalous conditions or noise and to protect the circuitry from "ringing" effects. The sensing circuitry need not operate at the same frequency as the receiver apparatus since, with respect to impulsive noise, a disturbance in time (e.g., a lightning discharge) will effect all parts of the VLF spectrum. In fact, a plurality of sensing circuits can be operated in parallel to facilitate determination of unperturbed "windows" in noise.

In summary, the basic concept embodied in the inventive concept is that once phase lock is obtained, the phase of individual cycles of received signals can be readily compared with a reference track phase of an oscillator. Under normal circumstance (i.e., a minimal or nominal noise environment), the input phase should remain relatively constant except for undesirable jitter caused by the existing noise. Consequently, if the noise level is very low, the received phase will be within a very small tolerance of the reference; in higher noise environments, however, a greater departure from the reference level indicates noise contamination. During such contaminated or disturbed periods a receiver can be blanked or gated to eliminate noise perturbation.

A noise burst causing contamination as above could occur due to lightning within a thunderstorm as previously described. Since noise burst is assumed to be of geophysical origin, and of a form affecting a broad frequency spectrum, it is not necessary that the blanking information be derived from the same signal being tracked. In effect, blanking can be steered by information derived from any other signal which is measured simultaneously.

If several frequencies are being simultaneously phase tracked it is therefore possible that all blanking aids be combined since, while a noise perturbation might be nearly coherent with a phase on one signal, it is highly unlikely to be coherent on two or more signals. By this means, tracking of all incoming signals would be enhanced.

Obviously the input phase is not generally constant as assumed for purposes of discussion. Consequently, variation may be expected due to frequency differences between the reference and the source. The variation will be propagational in nature and Doppler in nature if the receiver is being displaced. Phase tracking under these conditions is well-known and can be facilitated by conventional techniques such as rate-gating, type-2 servo implementation, etc.

After removal of the complexities, however, the phase tracking problem is reduced to essentially a simple case considered where the input phase is not expected to vary much within the time constant of the primary phase tracking integrator. At the same time a time constant associated with any front end narrow banding is very much shorter than the principal phase tracking time constant. Hence, within or ahead of the phase tracking circuitry, the phase is capable of rapid response to noise. These are the essential conditions. It is apparent that provision must be made so that excessive blanking does not occur. Thus, the width of the tolerance gate must be related to its duty cycle in such a manner that the circuit cannot be satisfied only by random noise. For example, the gate may operate 95 percent of the time if the tolerance is 1 percent of a period, but could not operate 95 percent of the time if the tolerance was 5 percent of the period. Obviously, this condition can be modified if multiple frequencies are used simultaneously and control of the tolerance based on duty cycle may also be desirable.

In a single frequency operation, the tolerance must be related to the confidence in the output and should be selected such that all signals are accepted until the phase is acquired. Use of a gating criterion wherein one frequency is derived from comparison at another implies that the perturbation characteristics of the noise are indeed simultaneous. In practice, minor differences may be expected owing to dispersion of propagation delay. These differences, however, are negligible for the usual time constant employed in VLF receivers.

It can be appreciated by one skilled in the art that receivers or receiver complexes implementing the concept disclosed above are potentially capable of maintaining a quality phase track in infinite RMS noise condition provided only that a sufficient number of windows exist, and that novel VLF phase tracker apparatus have been disclosed for detecting noise perturbation of signals of interest.

Obviously many modifications and variations of the present invention are possible in the light of the above teachings. It is therefore to be understood that within the scope of the appended claims the invention may be practiced otherwise than as specifically described.

What is claimed is;

1. VLF phase tracker apparatus comprising:
first antenna means for receiving incoming VLF signals at frequency $f_1$;
second antenna means for receiving incoming VLF signals at frequency $F_2$ simultaneously with the receipt of said signals at $F_1$ by said first antenna means;
sampling means connected to the output of said second antenna means for sampling said signals at frequency $f_2$ in a quadrature manner;
digital computer means connected to the output of said sampling means and being responsive to the output thereof to compare the phase and amplitude thereof with selectively predetermined nominal values;
receiver blanking means connected to the output of said first antenna means;
receiver means connected to the output of said blanking means;
said blanking means being connected at an input thereof to the output of said computer means and being responsive thereto to blank said signals at $f_1$ from said receiver means when said output from said computer indicates that said phase and amplitude have exceeded said selectively predetermined nominal values.

2. The apparatus of claim 1 wherein said sampling means includes a wide band filter, an amplifier, and an analog-to-digital converter connected in series to the output of said second antenna means.

3. The apparatus of claim 2 further including oscillator means connected to said converter for driving same at a frequency $4f_2$.

4. The apparatus of claim 1 wherein said computer means includes means for computing said phase, $\phi$, and amplitude, A, in accordance with the equations:

$$\phi = \tan^{-1} \frac{E_i}{\frac{|E_{i+1}| + |E_{i-1}|}{2}}, \text{ and}$$

$$A = \sqrt{\left(\frac{E_i^2 + |E_{i+1}| + |E_{i-1}|}{2}\right)^2}$$

where $E$ = encoded voltage, and $i$ = sampling index.

5. VLF phase tracker apparatus comprising first means for receiving incoming VLF signals at $f_1$, second means for receiving incoming VLF signals at $f_2$ simultaneously with said signals at $f$ and including phase lock means, means for comparing the phase of individual cycles of said signals at $F_2$ with a reference track phase and for providing an output signal in response to a selectively predetermined phase difference, and blanking circuit means being responsive to said output signal to block said signals at $f_1$ from said first means for receiving signals at $f_1$.

* * * * *